United States Patent
Hokenek et al.

(10) Patent No.: US 6,912,623 B2
(45) Date of Patent: Jun. 28, 2005

(54) METHOD AND APPARATUS FOR MULTITHREADED CACHE WITH SIMPLIFIED IMPLEMENTATION OF CACHE REPLACEMENT POLICY

(75) Inventors: Erdem Hokenek, Yorktown Heights, NY (US); C. John Glossner, Carmel, NY (US); Arthur Joseph Hoane, Yonkers, NY (US); Mayan Moudgill, White Plains, NY (US); Shenghong Wang, Yorktown Heights, NY (US)

(73) Assignee: Sandbridge Technologies, Inc., White Plains, NY (US)

( * ) Notice: Subject to any disclaimer, the term of this patent is extended or adjusted under 35 U.S.C. 154(b) by 151 days.

(21) Appl. No.: 10/161,874

(22) Filed: Jun. 4, 2002

(65) Prior Publication Data

US 2003/0225976 A1 Dec. 4, 2003

(51) Int. Cl.[7] .............................................. G06F 12/00
(52) U.S. Cl. ...................... 711/133; 711/134; 711/135; 711/136
(58) Field of Search ................................ 711/118, 119, 711/133–136, 144, 145; 712/1, 10, 228

(56) References Cited

U.S. PATENT DOCUMENTS

| | | | | |
|---|---|---|---|---|
| 4,833,642 A | * | 5/1989 | Ooi | 365/49 |
| 5,535,361 A | * | 7/1996 | Hirata | 395/472 |
| 6,341,347 B1 | * | 1/2002 | Joy | 712/228 |
| 2001/0014931 A1 | * | 8/2001 | Aglietta | 711/129 |
| 2002/0010839 A1 | * | 1/2002 | Tirumala | 711/133 |
| 2002/0120817 A1 | * | 8/2002 | Lesartre | 711/128 |
| 2002/0138717 A1 | * | 9/2002 | Joy | 712/235 |
| 2003/0004683 A1 | * | 1/2003 | Newawarkar | 702/186 |
| 2003/0126375 A1 | * | 7/2003 | Hill | 711/145 |

* cited by examiner

Primary Examiner—Kimberly McLean-Mayo
(74) Attorney, Agent, or Firm—Ryan, Mason & Lewis, LLP

(57) ABSTRACT

A cache memory for use in a multithreaded processor includes a number of set-associative thread caches, with one or more of the thread caches each implementing an eviction process based on access request address that reduces the amount of replacement policy storage required in the cache memory. At least a given one of the thread caches in an illustrative embodiment includes a memory array having multiple sets of memory locations, and a directory for storing tags each corresponding to at least a portion of a particular address of one of the memory locations. The directory has multiple entries each storing multiple ones of the tags, such that if there are n sets of memory locations in the memory array, there are n tags associated with each directory entry. The directory is utilized in implementing a set-associative address mapping between access requests and memory locations of the memory array. An entry in a particular one of the memory locations is selected for eviction from the given thread cache in conjunction with a cache miss event, based at least in part on at least a portion of an address in an access request associated with the cache miss event.

15 Claims, 5 Drawing Sheets

METHOD AND APPARATUS FOR MULTITHREADED CACHE WITH SIMPLIFIED IMPLEMENTATION OF CACHE REPLACEMENT POLICY

RELATED APPLICATION(S)

The present invention is related to the invention described in U.S. patent application Ser. No. 10/161,774, filed concurrently herewith and entitled "Method and Apparatus for Multithreaded Cache with Cache Eviction Based on Thread Identifier," which is hereby incorporated by reference herein.

FIELD OF THE INVENTION

The present invention relates generally to the field of computer architecture, and more particularly to cache memory for use in a multithreaded processor.

BACKGROUND OF THE INVENTION

As is well known, processors are often used in conjunction with a memory system that includes a hierarchy of different storage elements. For example, such a memory system may include a backing store, a main memory and a cache memory, as described in, e.g., M. J. Flynn, "Computer Architecture: Pipelined and Parallel Processor Design," Jones and Bartlett Publishers, Boston, Mass., 1995, which is hereby incorporated by reference herein.

The backing store, which represents the highest-level memory in the hierarchical memory system, is considered furthest from the processor in terms of access time, and typically requires a large number of cycles to access. A representative example is a hard drive. The backing store may have a capacity on the order of gigabytes (GB), and an access time of about $10^{-3}$ seconds.

Main memory or Level 1 memory resides reasonably close in access time to the processor. A representative example is dynamic random access memory (DRAM). It has a typical capacity on the order of megabytes (MB) but has a much faster access time than the backing store, typically on the order of $10^{-8}$ seconds.

The cache memory, also referred to as a Level 0 memory or simply as "cache," provides efficient and high-speed access to the most frequently used data, and resides closest to the processor in terms of access time. A representative example is static random access memory (SRAM). It is typically small, with a capacity on the order of kilobytes (kB), but has very fast access times, on the order of $10^{-9}$ seconds.

The cache memory works on the principle of locality. Locality can include spatial, temporal or sequential locality. Spatial locality refers to the likelihood that a program being executed by the processor will access the same or neighboring memory locations during the period of execution. Temporal locality refers to the property that if a program includes a sequence of accesses to a number of different locations, there is a high probability that accesses following this sequence will also be made into the locations associated with the sequence. Sequential locality refers to the property that if an access has been made to a particular location s, then it is likely that a subsequent access will be made to the location s+1. Processor data accesses are also referred to herein as "references."

An address mapping control function implemented by a cache controller determines how data is stored in the cache and moved from Level 1 or higher level memory into the cache. If a particular processor data access is satisfied by the cache, the access is referred to as a "cache hit," and otherwise is referred to as a "cache miss." A cache typically fetches lines of memory from the higher level memories. The size of the line is generally designed to be consistent with the expected spatial locality of the programs being executed.

A cache may be organized to fetch data on demand or to prefetch data. Most processors use the fetch on demand approach whereby when a cache miss occurs the cache controller will evict a current line and replace it with the line referenced by the processor. In the prefetch approach, the cache controller tries to predict which lines will be required and then moves those lines into the cache before the processor references them.

The three basic types of address mapping control used in conventional cache memory are fully associative mapping, direct mapping and set-associative mapping. The fully associative mapping and direct mapping approaches are illustrated in FIGS. 1 and 2, respectively. In these figures, the cache controller and at least a portion of its corresponding mapping logic circuitry are omitted for simplicity and clarity of illustration.

FIG. 1 shows a cache memory 100 that utilizes fully associative address mapping. The cache 100 includes a memory array 102 and a directory 104. The figure illustrates the manner in which the cache processes an access request 106. The access request 106 includes a tag 110, an offset 112, and a byte/word select (B/W) field 114. Illustratively, the portions 110, 112 and 114 of the access request 106 may be 18 bits, 3 bits and 3 bits, respectively, in length. The tag 110 is compared against the entries in the directory 104. A cache hit results if a tag 120 in a particular entry 104-k of the directory 104 matches the tag 110 of access request 106. In this case, the corresponding address 122 also stored in entry 104-k of directory 104 is used in conjunction with the offset 112 of the access request 106 to identify a particular line 102-j in the memory array 102. The requested line is then sent to the processor. A cache miss occurs in this example if the tag 110 does not match any tag stored in the directory 104. The memory array 102 as shown includes 4 kB of data, arranged in 512 lines of 8 bytes each. As illustrated in the figure, a particular one of the 512 lines in memory array 102 is identified by a unique 9-bit address comprising the 6-bit address 122 from directory 104 in combination with the 3-bit offset 112.

FIG. 2 shows a cache memory 200 that utilizes direct mapping. The cache 200 includes a memory array 202 and a directory 204. The figure illustrates the manner in which the cache processes an access request 206. The access request 206 includes a tag 210, an index 211, an offset 212 and a B/W field 214. Illustratively, the portions 210, 211, 212 and 214 of the access request 206 may be 10 bits, 8 bits, 3 bits and 3 bits, respectively, in length. In accordance with the direct mapping approach, the index 211 is used to identify a particular entry 204-k in the directory 204. The particular entry 204-k includes a tag 220. Since only the index 211 is used to identify a particular entry in the directory 204, access requests for different addresses may map to the same location in the directory 204. The resulting tag 220 is therefore compared to the tag 210 of the access request 206 in a comparator 222, the Match output thereof being driven to a logic high level if the two tags match and otherwise being at a logic low level. The Match output is used as an enable signal for a gate 224 which determines whether a particular entry 202-j of the memory array 202, as determined based on the index 211 and offset 212, will be supplied to the processor. A cache hit results if a tag 220 as stored in an entry 204-k of the directory 204 matches the tag 210 of access request 206, and otherwise a cache miss results. The memory array 202 as shown includes 16 kB of data, arranged in 2048 lines of 8 bytes each. A particular one of the 2048 lines in memory array 202 is thus identified by a unique 11-bit address comprising the 8-bit index 211 in combination with the 3-bit offset 212.

A set-associative cache operates in a manner similar to the above-described direct-mapped cache 200 except that multiple choices for the access request address may be present. The memory array of a set-associative cache is separated into different portions or sets, and the directory includes multiple tags in each entry thereof, with each tag corresponding to one of the sets. The tag portion of each access request address is compared to each of the tags in a particular entry of the directory, as identified by an index portion of the access request. If a match is found, the result of the comparison is also used to select a line from one of the sets of the memory array for delivery to the processor.

In the event of a cache miss in one of the above-described cache memories, the corresponding data is generally evicted from the cache, and the correct data fetched and stored in the cache. Many replacement policies are available to decide which data should be evicted. For example, a Least Recently Used (LRU) replacement policy attempts to exploit temporal locality by always removing the data associated with the oldest non-accessed location in the cache. In order to maintain state information for implementing the LRU replacement policy for n resources, where n may denote, for example, the number of sets in a set-associative cache memory, one known approach requires $n^2$ bits of state information. Further enhancements have been developed that reduce the requirement to $n(n-1)/2$ bits of state information, as described in G. A. Blaauw et al., "Computer Architecture: Concepts and Evolution," Addison-Wesley, Reading, Mass., 1997, which is incorporated by reference herein. Other example replacement policies used in cache memory include random replacement and first in-first out (FIFO) replacement.

The example memory caches in FIGS. 1 and 2 are described in the context of a processor reading data from a memory location. An analogous scenario exists for a processor writing data to a memory location. The main difference is that the data is written by the processor into the appropriate location in the memory array of the cache, and the cache then has to determine when to write this data back to main memory. A write-through cache stores into both main memory and the cache memory array immediately. A copy-back cache marks a given line as "dirty" if a write has occurred to any position in the line, and main memory is only updated if the line is being evicted and it was marked as dirty.

A significant problem associated with conventional cache memories of the type described above is that they are generally not optimized for use with multithreaded processors, that is, processors which support simultaneous execution of multiple distinct instruction sequences or "threads." A need therefore exists for improved techniques for implementation of cache memory in a multithreaded processor.

SUMMARY OF THE INVENTION

The present invention provides an improved multithreaded cache memory which in an illustrative embodiment provides a simplified implementation of a cache replacement policy, by utilizing at least a portion of an address in an access request to control the determination of one or more lines or other entries to be evicted from the cache in the event of a cache miss.

In accordance with one aspect of the invention, a cache memory for use in a multithreaded processor includes a number of set-associative thread caches, with one or more of the thread caches each implementing an address-based eviction process that reduces the amount of replacement policy storage required in the cache memory.

One or more of the thread caches in the illustrative embodiment each includes a memory array having multiple sets of memory locations, and a directory for storing tags each corresponding to at least a portion of a particular address of one of the memory locations. The directory has multiple entries each storing multiple ones of the tags, such that if there are n sets of memory locations in the memory array, there are n tags associated with each directory entry. The directory is utilized in implementing a set-associative address mapping between access requests and memory locations of the memory array. An entry in a particular one of the memory locations is selected for eviction from the thread cache in conjunction with a cache miss event, based at least in part on at least a portion of an address in an access request associated with the cache miss event.

As a more particular example, the directory may be divided into first and second portions, such that a given entry in the directory has two or more tags in each portion, with the lowest order bit of a tag portion of the access request address being used to select a portion of the directory from which a tag will be selected for eviction from the thread cache. After a particular portion of the directory has been selected using the lowest order bit of the tag portion of the access request address, a particular tag from the selected portion may be determined using one or more replacement policy bits. The particular tag and its corresponding memory location entry are then evicted from the cache.

Advantageously, the invention reduces replacement policy state complexity in a cache memory, allowing the replacement policy to be implemented with less circuitry than would otherwise be required, and thereby providing both circuit area and power savings over the conventional approaches described previously.

DETAILED DESCRIPTION OF THE INVENTION

The present invention will be illustrated herein as implemented in a multithreaded cache memory of a multithreaded processor. It should be understood, however, that the invention does not require the use of the particular multithreaded cache and processor configurations of the illustrative embodiment, and is more generally suitable for use in any set-associative cache memory application that involves threaded processing and for which a reduction in replacement policy circuit complexity is desired.

Figure 1:
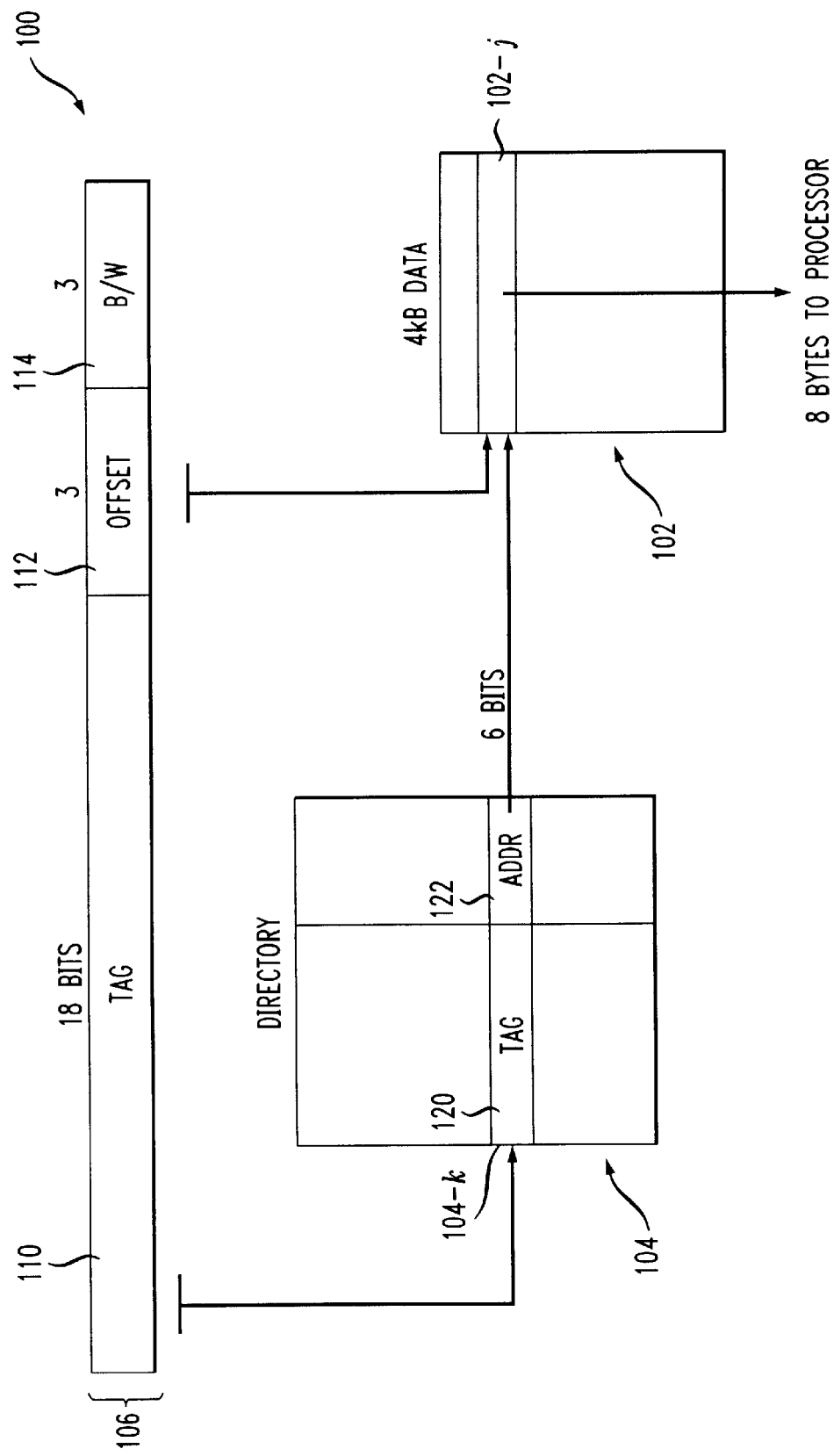
FIG. 1 shows a conventional cache memory with fully associative mapping.
Figure 2:
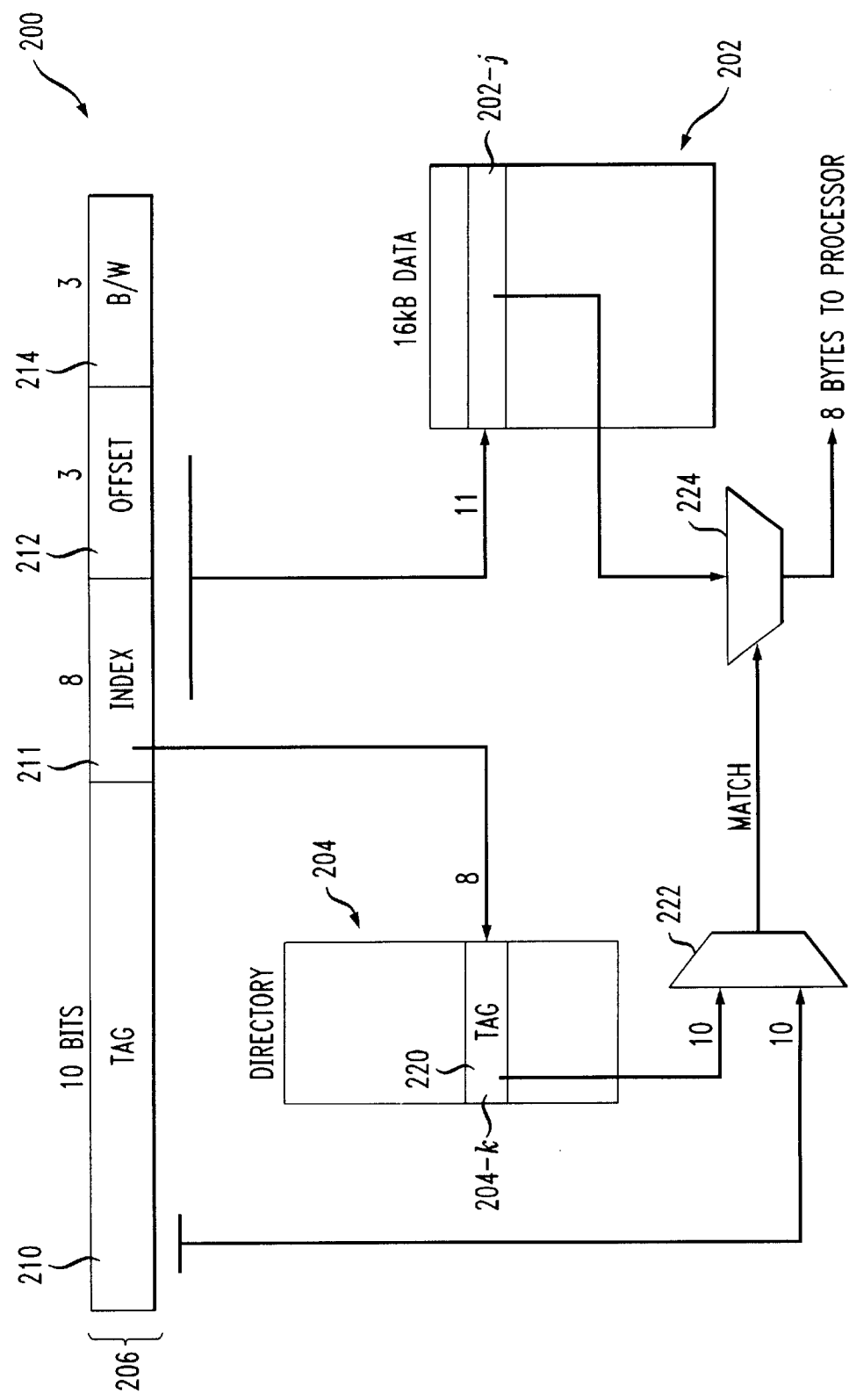
FIG. 2 shows a conventional cache memory with direct mapping.
Figure 3A:
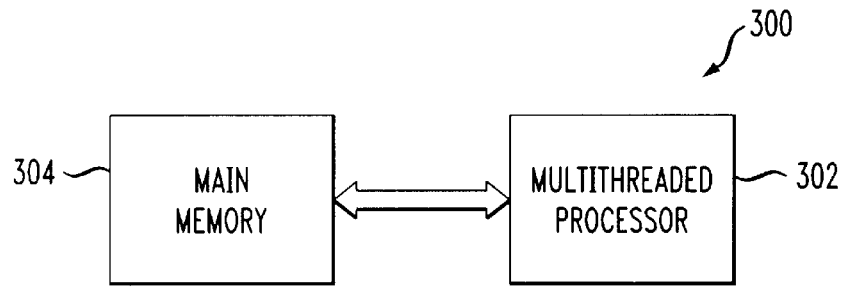
FIG. 3A is a block diagram of an example processing system in which the invention is implemented.
Figure 3B:
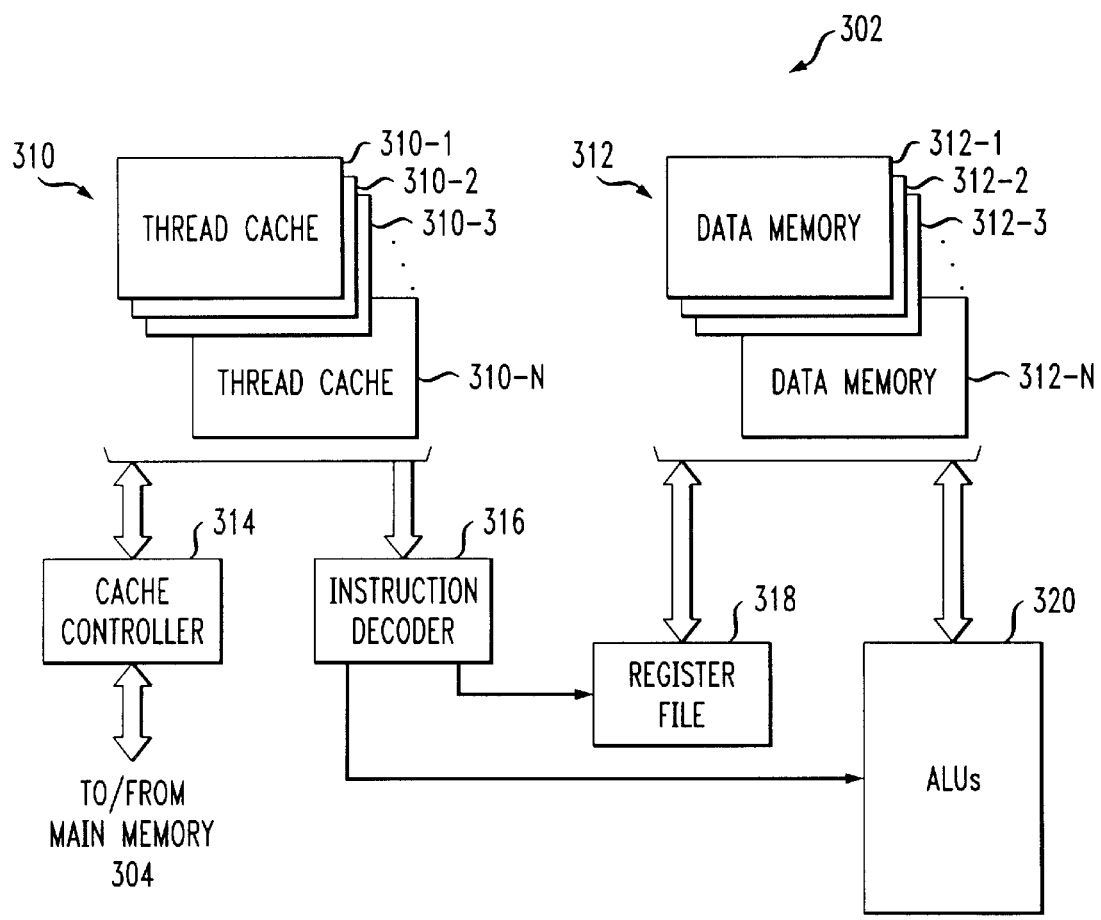
FIG. 3B is a more detailed block diagram of a multithreaded processor in the FIG. 3A processing system, showing a multithreaded cache in which the invention is implemented.

An example processing system 300 which implements a multithreaded cache memory in accordance with the invention will be described in conjunction with FIGS. 3A, 3B, 4 and 5. FIG. 3A shows the processing system 300 as including a multithreaded processor 302 coupled to a main memory 304. FIG. 3B shows a more detailed view of one possible implementation of the multithreaded processor 302. In this embodiment, the multithreaded processor 302 includes a multithreaded cache 310, a data memory 312, a cache controller 314, an instruction decoder 316, a register file 318, and a set of arithmetic logic units (ALUs) 320. The multithreaded cache 310 is also referred to herein as a cache memory. It should be emphasized that the particular arrangements shown in FIGS. 3A and 3B are simplified for clarity of illustration, and additional or alternative elements not explicitly shown may be included, as will be apparent to those skilled in the art.

The multithreaded cache 310 includes a plurality of thread caches 310-1, 310-2, . . . 310-N, where N generally denotes the number of threads supported by the multithreaded processor 302. Each thread thus has a corresponding thread cache associated therewith in the multithreaded cache 310. Similarly, data memory 312 includes N distinct data memory instances, denoted data memories 312-1, 312-2, . . . 312-N as shown.

The multithreaded cache 310 interfaces with the main memory 304 via the cache controller 314. The cache controller 314 ensures that the appropriate instructions from main memory 304 are loaded into the multithreaded cache 310. The cache controller 314 in this illustrative embodiment, operating in conjunction with logic circuitry or other processing elements associated with the individual thread caches 310-1, 310-2, . . . 310-N, implements at least a portion of a set-associative address mapping and a least recently used (LRU) replacement policy. The set-associative address mapping and LRU replacement policy will be described in greater detail in conjunction with FIGS. 4 and 5. The particular mapping approach and LRU replacement policy of the illustrative embodiment, however, should not be construed as limitations of the invention. Other set-associative mapping implementations and alternative replacement policies, such as random replacement or FIFO replacement, can also be used in conjunction with the invention.

In general, the multithreaded cache 310 is used to store instructions to be executed by the multithreaded processor 302, while the data memory 312 stores data that is operated on by the instructions. Instructions are fetched from the multithreaded cache 310 by the instruction decoder 316 which operates in conjunction with the register file 318 and the ALUs 320 in controlling the execution of the instructions in a conventional manner. The operation of multithreaded processor elements such as 316, 318 and 320 is well-understood in the art, and therefore not described in further detail herein.

Figure 4:
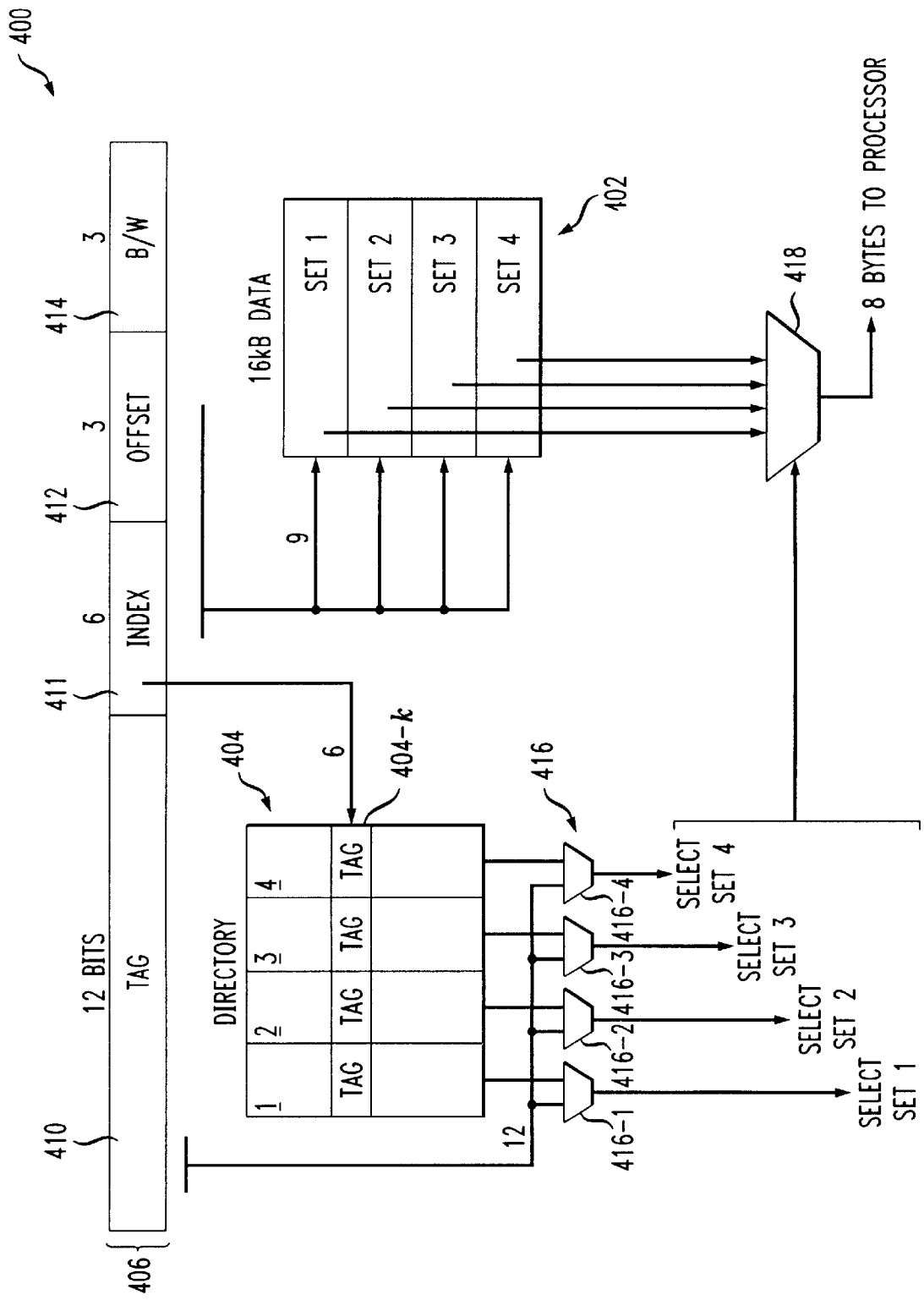
FIG. 4 shows a cache memory with set-associative address mapping that may be utilized in conjunction with the invention.
Figure 5:
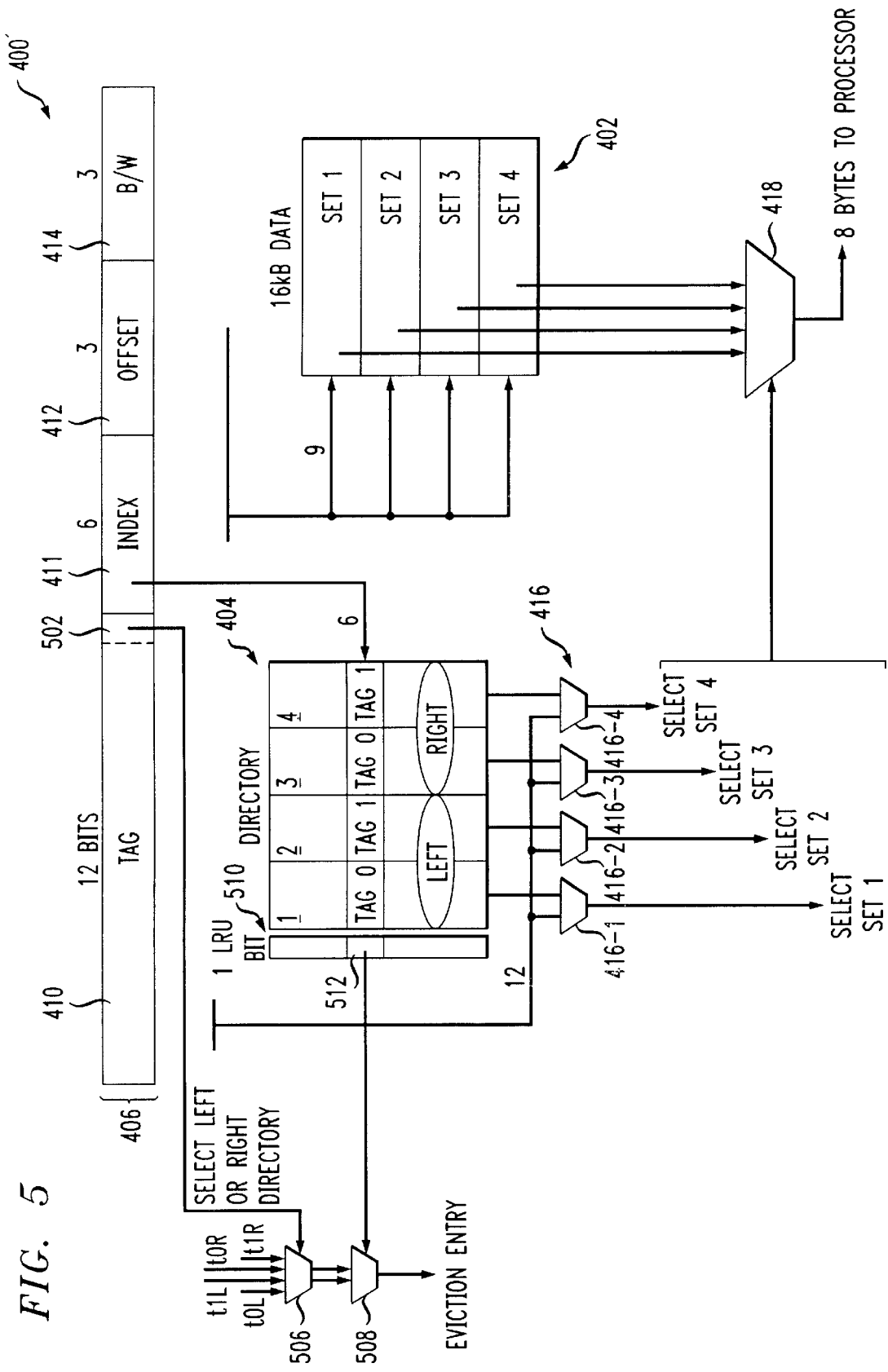
FIG. 5 illustrates a cache memory in accordance with an illustrative embodiment of the invention.

FIG. 4 illustrates a set-associative address mapping that may be implemented in a given one of the thread caches of the multithreaded cache 310. As shown in FIG. 4, the set-associative mapping does not include the improved address-based cache eviction techniques of the invention. FIG. 5 illustrates the FIG. 4 thread cache as configured to incorporate address-based cache eviction in accordance with the invention.

With reference initially to FIG. 4, a thread cache 400 with set-associative address mapping is shown. The thread cache 400 is assumed to correspond to a particular one of the thread caches in multithreaded cache 310 of FIG. 3B, and all or a subset of the other thread caches in the multithreaded cache 310 may be implemented in a similar manner. The thread cache 400 as shown includes a memory array 402 and a directory 404. The memory array 402 includes a number of different sets of memory locations. In this embodiment, the number of different sets of memory locations is four, with the sets denoted Set 1, Set 2, Set 3 and Set 4 as shown, although other embodiments could use more than or fewer than four sets. The directory 404 includes multiple entries, each of which stores four tags. Each of the tags in a given entry in the directory 404 corresponds to the address of a particular memory location in a corresponding one of the sets in the memory array 402. More particularly, a given entry 404-k in the directory 404 includes four distinct tags as shown, with each of the tags controlling a mapping to a corresponding memory location in one of the sets Set 1, Set 2, Set 3 or Set 4 of the memory array 402. In general, in a set-associative cache of this type, if the memory array 402 includes n sets of memory locations, each entry in the directory 404 stores n tags. The directory 404 may thus be viewed as being separated into four portions as shown, the portions being denoted 1, 2, 3 and 4 in the figure, with each portion being associated with only a single tag in each entry of the directory 404.

In the set-associative thread cache 400 of FIG. 4, an example access request 406 processed by the cache includes a tag 410, an index 411, an offset 412 and a B/W field 214. The access request may originate from the instruction decoder 316 in conjunction with an instruction fetch operation in the multithreaded processor 302. Illustratively, the portions 410, 411, 412 and 414 of the access request 406 may be 12 bits, 6 bits, 3 bits and 3 bits, respectively, in length. These field lengths and the particular access request configuration are shown by way of example only, and should not be construed as limiting the scope of the invention in any way. In accordance with the set-associative mapping approach, the index 411 is used to identify a particular entry 404-k in the directory 404. The particular entry 404-k, like each of the other directory entries in this embodiment, includes four tags as shown, each associated with one of the sets Set 1, Set 2, Set 3 or Set 4 of the memory array 402. Each of the tags is assumed without limitation to be the same length as the tag 410, that is, 12 bits in this embodiment. These tags of the identified entry 404-k are each compared to the tag 410 in a corresponding one of four comparators 416. More particularly, the first tag from portion 1 of the directory entry 404-k is compared to the tag 410 in comparator 416-1, the second tag from portion 2 is compared to the tag 410 in comparator 416-2, the third tag from portion 3 is compared to the tag 410 in comparator 416-3, and the fourth tag from portion 4 is compared to the tag 410 in comparator 416-4. The outputs of the comparators 416 form a set of select signals, each for selecting a corresponding one of the sets Set 1, Set 2, Set 3 or Set 4.

In the event of a match between the tag 410 and one of the tags from the directory entry 404-k, the corresponding select signal is enabled, e.g., driven to a logic high level. Otherwise, there is a cache miss and no select signal is enabled. Only a single one of the select signals is enabled at a given time. The select signals are applied to a select signal input of a multiplexer 418, which based on the particular one of the select signals that is enabled selects the line from the corresponding memory location in the selected set of the memory array 402 for delivery to the processor. More particularly, in the present embodiment, the requested line may be delivered to the instruction decoder 316 for decoding and execution in the multithreaded processor 302.

The memory array 402 as shown includes 16 kB of data, arranged in 2048 lines of 8 bytes each. Each of the sets Set 1, Set 2, Set 3 and Set 4 includes 512 lines. A particular one of the lines in a given one of the four distinct sets of the memory array 402 is thus identifiable by a unique 9-bit address, which in this embodiment comprises the 6-bit index 411 in combination with the 3-bit offset 412.

The tag 410, index 411 and offset 412 in the FIG. 4 embodiment may be collectively viewed as an address associated with the access request 406. The term "address" as used herein should be understood to include any portion or portions of an access request that include address-related information. It is to be appreciated that the invention does not require any particular access request address format. Moreover, the particular format of access request 406 is by way of example only, and not a requirement of the invention. A given access request in accordance with the invention can include more or less address information than that shown in FIG. 4, in other formats, and can include additional or alternative information of a type known to those skilled in the art.

In accordance with one aspect of the invention, a line or other entry in a particular one of the memory locations in a given set of the memory array 402 is selected for eviction in conjunction with a cache miss event based at least in part on an access request address. As indicated previously, the address-based eviction process will be described in greater detail in conjunction with FIG. 5.

Referring now to FIG. 5, a thread cache 400' is shown. The thread cache 400' corresponds to a particular one of the thread caches in the multithreaded cache 310 of FIG. 3B, and all or a subset of the other thread caches in the multithreaded cache 310 may be configured in a similar manner. The thread cache 400' includes the memory array 402, directory 404, comparators 416 and multiplexer 418, each operating substantially as previously described in conjunction with FIG. 4 in processing access requests such as the access request 406. The address-based eviction process in the illustrative embodiment makes use of a low order or least significant bit (LSB) 502 of the tag portion 410 of the access request 406. The thread cache 400' further includes eviction entry determination multiplexers 506 and 508, and a replacement policy storage element which in this embodiment is in the form of an LRU state register 510. The LRU state register 510 in this illustrative embodiment comprises a one-bit register which stores a single bit 512 of state information.

The eviction entry determination multiplexers 506 and 508, and the LRU state register 510, although shown as elements of the thread cache 400' in FIG. 5, may each be implemented in whole or in part outside of the thread cache. For example, these and other elements relating to address mapping and replacement policy implementation in a given thread cache may be implemented in whole or in part in the cache controller 314, or in another portion of the multithreaded processor 302.

The eviction entry determination multiplexers 506 and 508 collectively determine a particular tag to be evicted from the directory 404, and thereby an entry to be evicted from the corresponding memory location in the memory array 402.

The directory 404 as shown in FIG. 5 is divided into left and right portions as shown. More particularly, the left portion of the directory 404 includes the two left-most portions 1 and 2, and the right portion of the directory 404 includes the two right-most portions 3 and 4. The left and right portions thus collectively encompass the entire directory 404, and each of the left and right portions includes two tags for each entry of the directory 404. The LSB 502 of the tag portion 410 of the access request 406 is applied as a select signal to the multiplexer 506 to select two of four inputs for propagation to the input of the multiplexer 508. The four inputs to the multiplexer 506 are denoted t0L, t1L, t0R and t1R as shown, and correspond to tag 0 from the left portion of the directory, tag 1 from the left portion of the directory, tag 0 from the right portion of the directory, and tag 1 from the right portion of the directory, respectively. The LSB 502 is used to select either the left directory tags or the right directory tags for propagation to the input of the multiplexer 508.

The input to the multiplexer 508 is thus either the left directory tags t0L, t1L or the right directory tags t0R, t1R. The LRU bit 512 is supplied as a select signal to the multiplexer 508, and is thereby used to select one of the applied left or right directory tags for eviction from the thread cache 400'. Once a given tag is selected for eviction, the tag and its corresponding memory location entry may be evicted from the thread cache in a conventional manner, e.g., may be overwritten with new entry information in a manner well understood in the art.

Although the LSB 502 of the tag portion 410 of the access request address is used in the cache eviction process in the FIG. 5 embodiment, this is by way of example only. In other embodiments, other portions of the access request address may be used, such as, for example, multiple low order bits of the tag portion, one or more bits of other portions of the access request address, and so on. The particular portions used in a given embodiment will generally depend on application specific factors such as the access request format, address format, cache memory configuration, etc.

The above-described address-based cache eviction technique provides significant improvements relative to conventional techniques. For example, the technique substantially reduces the amount of state information that must be stored in order to implement the LRU replacement policy. More particularly, in the above illustrative embodiment based on a set-associative cache with four sets, i.e., with n=4, only a single one-bit register is required to store state information for the LRU replacement policy. The conventional techniques mentioned previously require either $n^2$ or $n(n-1)/2$ bits of replacement policy state information, while the address-based eviction technique in the illustrative embodiment described above requires $n(n-2)/8$ bits of state information assuming the use of only a single bit of the access request address. The improvement provided by this illustrative embodiment over the conventional techniques is shown as a function of example values of n in the following table.

| Number of sets(n) | $n^2$ | $n(n-1)/2$ | $n(n-2)/8$ |
|---|---|---|---|
| 2 | 4 | 1 | 0 |
| 4 | 16 | 6 | 1 |

-continued

| Number of sets(n) | n² | n(n − 1)/2 | n(n − 2)/8 |
| --- | --- | --- | --- |
| 8 | 64 | 28 | 6 |
| 16 | 256 | 120 | 28 |
| 32 | 1024 | 496 | 120 |
| 64 | 4096 | 2016 | 496 |

Moreover, by reducing the amount of state information that must be stored to implement a replacement policy, the invention also provides a reduction in the circuit area and power requirements of a multithreaded cache memory.

As mentioned above, the foregoing table assumes the use of only a single bit of the access request address in implementing the cache eviction technique of the invention. It is possible, however, to use more than one bit of the access request address. For example, an embodiment with n=8 could have its directory partitioned into four portions, each portion having two tags per directory entry, with two low order bits of the tag portion of the access request address being used to select a particular one of the four portions from which a tag will be selected for eviction based on replacement policy state information. In this example, only a single bit of replacement policy state information is needed, as in the illustrative embodiment of FIG. 5.

Although described in conjunction with read accesses to memory locations in a memory array of a cache memory, the invention can also be used for write accesses to such locations. Otherwise conventional write techniques can be modified in a straightforward manner based on the disclosure herein to implement the techniques of the invention for write accesses.

As indicated previously, the invention can be implemented in any multithreaded processor which can be configured for utilization of a set-associative mapping. A more particular example of such a processor is described in detail in U.S. Provisional Application Ser. No. 60/341,289, filed Dec. 20, 2001, which is hereby incorporated by reference herein.

The above-described embodiment of the invention is intended to be illustrative only, and numerous alternative embodiments within the scope of the appended claims will be apparent to those skilled in the art. For example, a given thread cache directory can be divided into more than just a left and a right portion as in FIG. 5, that is, it can be divided into three or more distinct portions, with an appropriate increase in the number of access request address and replacement policy bits used to select a particular tag for eviction from a directory entry. The particular circuitry arrangements used to implement the eviction entry determination in the illustrative embodiment can be replaced with alternative arrangements. The number n of sets can be varied, as was indicated above. Moreover, other replacement policies, such as random replacement or FIFO replacement, can be used instead of the LRU replacement policy of the illustrative embodiment. As a more particular example with regard to random replacement, one or more bits of the access request address can be used to determine where within a given directory a particular random replacement will occur.

What is claimed is:

1. A cache memory for use in a multithreaded processor, the cache memory comprising a plurality of thread caches, at least a given one of the thread caches comprising:

a memory array comprising a plurality of sets of memory locations; and a directory for storing tags each corresponding to at least a portion of a particular address of one of the memory locations, the directory having a plurality of entries each storing multiple ones of the tags;

wherein an entry in a particular one of the memory locations is selected for eviction from the given thread cache in conjunction with a cache miss event based at least in part on at least a portion of an address in an access request associated with the cache miss event, by utilizing one or more bits of the address in the access request to identify a subset of a total number of tags in a given entry of the directory, with the entry selected for eviction being selected as an entry corresponding to a tag in the identified subset of the total number of tags in the given entry of the directory.

2. The cache memory of claim 1 wherein the plurality of sets of memory locations comprises n sets of memory locations and the directory entries each store n tags.

3. A cache memory for use in a multithreaded processor, the cache memory comprising a plurality of thread caches, at least a given one of the thread caches comprising:

a memory array comprising a plurality of sets of memory locations; and a directory for storing tags each corresponding to at least a portion of a particular address of one of the memory locations, the directory having a plurality of entries each storing multiple ones of the tags;

wherein an entry in a particular one of the memory locations is selected for eviction from the given thread cache in conjunction with a cache miss event based at least in part on at least a portion of an address in an access request associated with the cache miss event;

wherein the plurality of sets of memory locations comprises n sets of memory locations and the directory entries each store n tags; and wherein a total number of replacement policy state information bits required in the given thread cache is given approximately by $n(n-2)/8$.

4. The cache memory of claim 1 wherein the given thread cache operates as a set-associative cache.

5. The cache memory of claim 1 wherein the portion of the address comprises one or more bits of a tag portion of the address.

6. The cache memory of claim 1 wherein the given thread cache further comprises a register for storing one or more replacement policy bits, the memory location entry selected for eviction from the given thread cache being selected based at least in part on the access request address and the one or more stored replacement policy bits.

7. The cache memory of claim 6 wherein one or more bits of the access request address are used to determine a particular portion of the directory from which a tag will be selected for determination of the entry to be evicted from the given thread cache, the particular portion having in a given entry thereof multiple tags associated therewith, and further wherein the one or more stored replacement policy bits determine the selected tag from the multiple tags associated with the particular portion as determined based on the one or more bits of the access request address.

8. The cache memory of claim 1 wherein the given thread cache utilizes a least recently used (LRU) replacement policy in selecting the particular entry to be evicted from the thread cache.

9. The cache memory of claim 1 wherein one or more least significant bits of a tag portion of the access request address are utilized to determine a particular portion of the directory from which a tag corresponding to the memory location entry to be evicted is selected.

10. The cache memory of claim 1 wherein the directory is organized into a first portion and a second portion, each of the entries of the directory having one or more associated tags in the first portion of the directory and one or more associated tags in the second portion of the directory, and further wherein a least significant bit of the tag portion of the access request address is used to determine whether a tag corresponding to the entry to be evicted is selected from the first portion of the directory or the second portion of the directory.

11. The cache memory of claim 1 further comprising eviction determination circuitry associated with at least the given thread cache and comprising:

first selection circuitry for selecting the subset of the total number of tags in the given entry of the directory, based on one or more bits of the access request address; and second selection circuitry for selecting a particular one of the tags of the subset of tags for eviction from the directory, based on one or more replacement policy bits associated with the given thread cache.

12. A cache memory for use in a multithreaded processor, the cache memory comprising a plurality of thread caches, at least a given one of the thread caches comprising:

a memory array comprising a plurality of sets of memory locations; and a directory for storing tags each corresponding to at least a portion of a particular address of one of the memory locations, the directory having a plurality of entries each storing multiple ones of the tags;

wherein an entry in a particular one of the memory locations is selected for eviction from the given thread cache in conjunction with a cache miss event based at least in part on at least a portion of an address in an access request associated with the cache miss event;

the cache memory of further comprising eviction determination circuitry associated with at least the given thread cache and comprising;

first selection circuitry for selecting a subset of a total number of tags in a given entry of the directory, based on one or more bits of the access request address; and second selection circuitry for selecting a particular one of the tags of the subset of tags for eviction from the directory, based on one or more replacement policy bits associated with the given thread cache;

wherein the first selection circuitry comprises a first multiplexer having a plurality of inputs each corresponding to one of the tags and a select signal corresponding to the one or more bits of the access request address.

13. The cache memory of claim 12 wherein the second selection circuitry comprises a second multiplexer having a plurality of inputs each corresponding to an output of the first multiplexer and a select signal corresponding to the one or more replacement policy bits.

14. A multithreaded processor comprising:

a cache memory for storing instructions to be executed by the processor;

a data memory for storing data to be processed in accordance with the instructions;

an instruction decoder for decoding instructions fetched from the cache memory; and one or more arithmetic logic units for performing operations on the data in accordance with the decoded instructions;

wherein the cache memory comprises a plurality of thread caches, at least a given one of the thread caches comprising;

a memory array comprising a plurality of sets of memory locations; and a directory for storing tags each corresponding to at least a portion of a particular address of one of the memory locations, the directory having a plurality of entries each storing multiple ones of the tags;

wherein an entry in a particular one of the memory locations is selected for eviction from the given thread cache in conjunction with a cache miss event based at least in part on at least a portion of an address in an access request associated with the cache miss event, by utilizing one or more bits of the address in the access request to identify a subset of a total number of tags in a given entry of the directory, with the entry selected for eviction being selected as an entry corresponding to a tag in the identified subset of the total number of tags in the given entry of the directory.

15. A method of controlling a cache memory in a multithreaded processor, the cache memory comprising a plurality of thread caches, at least a given one of the thread caches comprising a memory array having a plurality of sets of memory locations and a directory for storing tags each corresponding to at least a portion of a particular address of one of the memory locations, the directory having a plurality of entries each storing multiple ones of the tags, the method comprising the steps of:

determining the occurrence of a cache miss event in the given thread cache; and selecting an entry in a particular one of the memory locations for eviction from the given thread cache in conjunction with the cache miss event based at least in part on at least a portion of an address in an access request associated with the cache miss event, by utilizing one or more bits of the address in the access request to identify a subset of a total number of tags in a given entry of the directory, with the entry selected for eviction being selected as an entry corresponding to a tag in the identified subset of the total number of tags in the given entry of the directory.

* * * * *

UNITED STATES PATENT AND TRADEMARK OFFICE
CERTIFICATE OF CORRECTION

PATENT NO. : 6,912,623 B2
DATED : June 28, 2005
INVENTOR(S) : E. Hokenek et al.

It is certified that error appears in the above-identified patent and that said Letters Patent is hereby corrected as shown below:

Title page,
Item [56], References Cited, OTHER PUBLICATIONS, add the following:
-- M.J. Flynn, "Computer Architecture: Pipelined and Parallel Processor Design," Jones and Bartlett Publishers, Boston, MA, Chapter 5, pp. 265-273, 1995 --.

Signed and Sealed this

Thirtieth Day of August, 2005

JON W. DUDAS
*Director of the United States Patent and Trademark Office*